United States Patent [19]

Park

[11] Patent Number: 4,782,396
[45] Date of Patent: Nov. 1, 1988

[54] AUTOMATIC FOCUSING SYSTEM OF VIDEO CAMERA USING THE CONTRAST CHARACTERISTICS OF THE Y SIGNAL

[75] Inventor: Hong C. Park, Seoul, Rep. of Korea
[73] Assignee: Gold Star Co., Ltd., Seoul, Rep. of Korea
[21] Appl. No.: 918,256
[22] Filed: Oct. 14, 1986
[30] Foreign Application Priority Data Aug. 7, 1986 [KR] Rep. of Korea ............... 6525/1986

[51] Int. Cl.$^4$ .................. G03B 3/00; H04N 5/232
[52] U.S. Cl. .................................................. 358/227
[58] Field of Search ................ 358/227; 354/400, 402

[56] References Cited

U.S. PATENT DOCUMENTS

| | | | |
|---|---|---|---|
| 4,414,575 | 11/1983 | Yamamoto et al. | 358/227 |
| 4,422,097 | 12/1983 | Inuiya | 358/227 |
| 4,531,158 | 7/1985 | Murakami et al. | 358/227 |
| 4,550,995 | 11/1985 | Toyama | 358/227 |

Primary Examiner—Jin F. Ng
Assistant Examiner—Stephen Brinich
Attorney, Agent, or Firm—Cushman, Darby & Cushman

[57] ABSTRACT

An automatic focusing system adjusts the focus of video camera automatically using the contrast of the Y signal, which is one image input signal. The maximum and minimum values of the Y signal determine the contrast of the Y signal. This contrast value is then compared with the previous contrast value to determine if the focus driving motor should be signalled to rotate in the same direction as previously, a different direction or to stop rotation. Gating means with stored ranges are used to establish the successive detection of the Y signals to allow continuous operation of the auto focus circuit. Thus, the system can always automatically focus without being affected by the peripheral background of object.

5 Claims, 2 Drawing Sheets

AUTOMATIC FOCUSING SYSTEM OF VIDEO CAMERA USING THE CONTRAST CHARACTERISTICS OF THE Y SIGNAL

BACKGROUND OF THE INVENTION

1. Field of the Invention

This invention relates to an automatic focusing system of video camera, and more particularly an automatic focusing system wherein the contrast of a Y signal, which is one of image input signals of a video camera, is detected and the value of this contrast is controlled into a maximum value, thereby automatically adjusting the focus of video camera.

2. Description of the Prior Art

Prior art systems could adjust the focus of a video camera automatically. However, these prior art focusing systems have drawbacks because they use a separate optical system, such as an infrared rays emitter, an infrared ray detector and a beam splitter and or the like, and are complicated in their structure, large, in size and heavy in weight, thereby being expensive and not able to automatically adjust the focus of the camera when an object is not distinguished from its peripheral background, such as when the object is a dark surface or is positioned outside of windows or beyond wire nettings.

OBJECT OF THE INVENTION

Accordingly, it is a primary object of the present invention to provide an automatic focusing system which can adjust the focus of a video camera by detecting the contrast of a Y signal that is part of a standard image output signal by means of circuitry and therefore not require the use of the prior art optical systems.

It is another object of the present invention to provide an automatic focusing system wherein the automatic focusing can always be made without being affected by the peripheral background of object.

SUMMARY OF THE INVENTION

These objects of the present invention are accomplished by an automatic focusing system comprising the following elements. A contrast detection circuit means detects the contrast and converts the contrast signal into a digital signal, the contrast signal being the difference between the maximum value and the minimum value of the Y signal. A contrast comparison circuit means compares the contrast value of the current field detected in the contrast detection circuit with that of the previous field to determine the drive direction of the focus motor, and to determine whether to signal the the drive of the focus motor to stop by deciding whether the absolute value of the difference between the contrast value of the current field and the previous field becomes less than a reference signal value, such as an optimal point state. A focus motor driving circuit means receives the output signal from the contrast comparison circuit and controls the drive of the focus motor as required. A gating indication circuit means sequentially indicates new ranges every time that the contrast output from the contrast detection circuit is determined to be less than the reference signal, and outputs a gating signal so that the Y signal is input to the contrast detection circuit. An automatic focus switching circuit means resets the gating indication means into an initial state and sets the state which allows a drive voltage to be applied to the motor driving circuit when it is switched into an automatic focus state.

BRIEF DESCRIPTION OF THE DRAWINGS

These and other objects and features of the present invention will become clear from the following description with reference to the accompanying drawings, wherein.

DETAILED DESCRIPTION OF THE INVENTION

Figure 1:
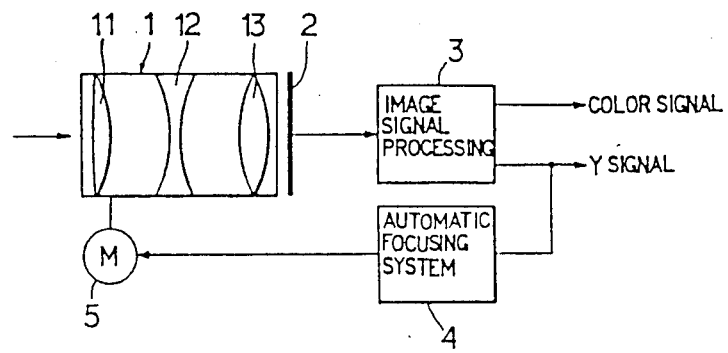
FIG. 1 is a functional block diagram of a video camera system which uses a focusing system in accordance with the present invention.

Referring to FIG. 1 which is a functional block diagram of the video camera applying an automatic focusing system of the present invention, there is shown a zoom lens 1 consisting of a focusing portion 11, a zooming portion 12 and an image defining portion 12, for serving to concentrate the image of an object and form on an image sensor 2. To adjust the focus point of zoom lens 1 accurately, the focusing portion 11 must be placed in an optimum position.

Further, the image sensor 2 generates an image signal according to the image of an object formed and then the image signal is processed in an image signal processing portion 3 to output color signals and a Y signal. Accordingly, the color signal and Y signal are input to a video cassette recorder (VCR) to be recorded thereby, or input to a monitor to reproduce the same image.

The automatic focusing system 4 of the present invention is adapted to control the focusing portion 11 in such a manner that is is placed in an optimum position by comparing and measuring the contrast of the Y signal output from the image signal processing portion 3 and thereafter determining the drive direction of the focus motor 5 by the resultant value.

Figure 2:
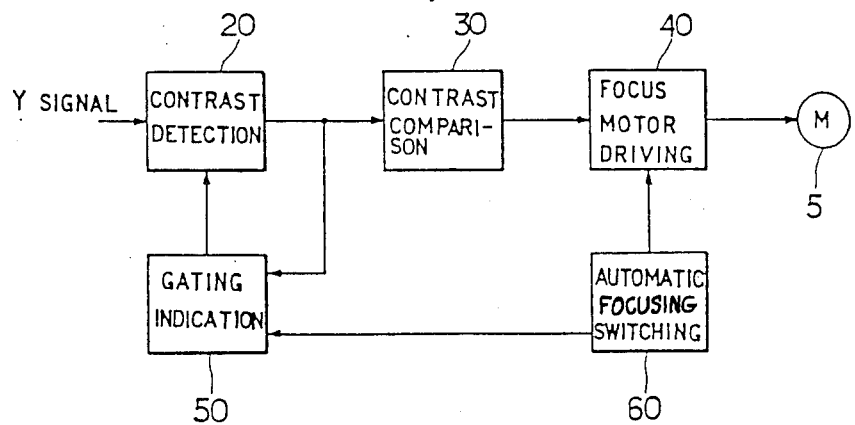
FIG. 2 is a detailed block diagram of an automatic focusing system in accordance with the present invention.

FIG. 2 shows a detailed block diagram of the automatic focusing system 4. The automatic focusing system 4 includes the following elements. contrast detection circuit 20 detects the contrast which is the difference between the maximum value and the minimum value of the Y signal output from the image signal processing portion and converts the contrast signal into a digital signal. A contrast comparison circuit 30 for compares the contrast value of the current field output from contrast detection circuit 20 with the contrast signal of the previous field to determine the drive direction of focus motor 5, and to determine whether to signal the the drive of focus motor 5 to stop by deciding whether absolute value of the difference between the contrast value of the current field and that of the previous field becomes less than a predetermined value of reference signal. A focus motor driving circuit 40 receives the output signal from the contrast comparison circuit 30 and controls the drive of focus motor. A gating indication circuit 50 sequentially indicates new ranges every time the contrast value output from the contrast detection circuit 20 is determined to be less than the predetermined reference signal value, and outputs the gating signal when to the contrast detection circuit 20 should input the Y signal. An automatic focus switching circuit 60 for resets the gating indication circuit 50 to an initial state when it is switched to an automatic focus state and applies a drive voltage to said focus motor driving circuit 40.

Figure 3:
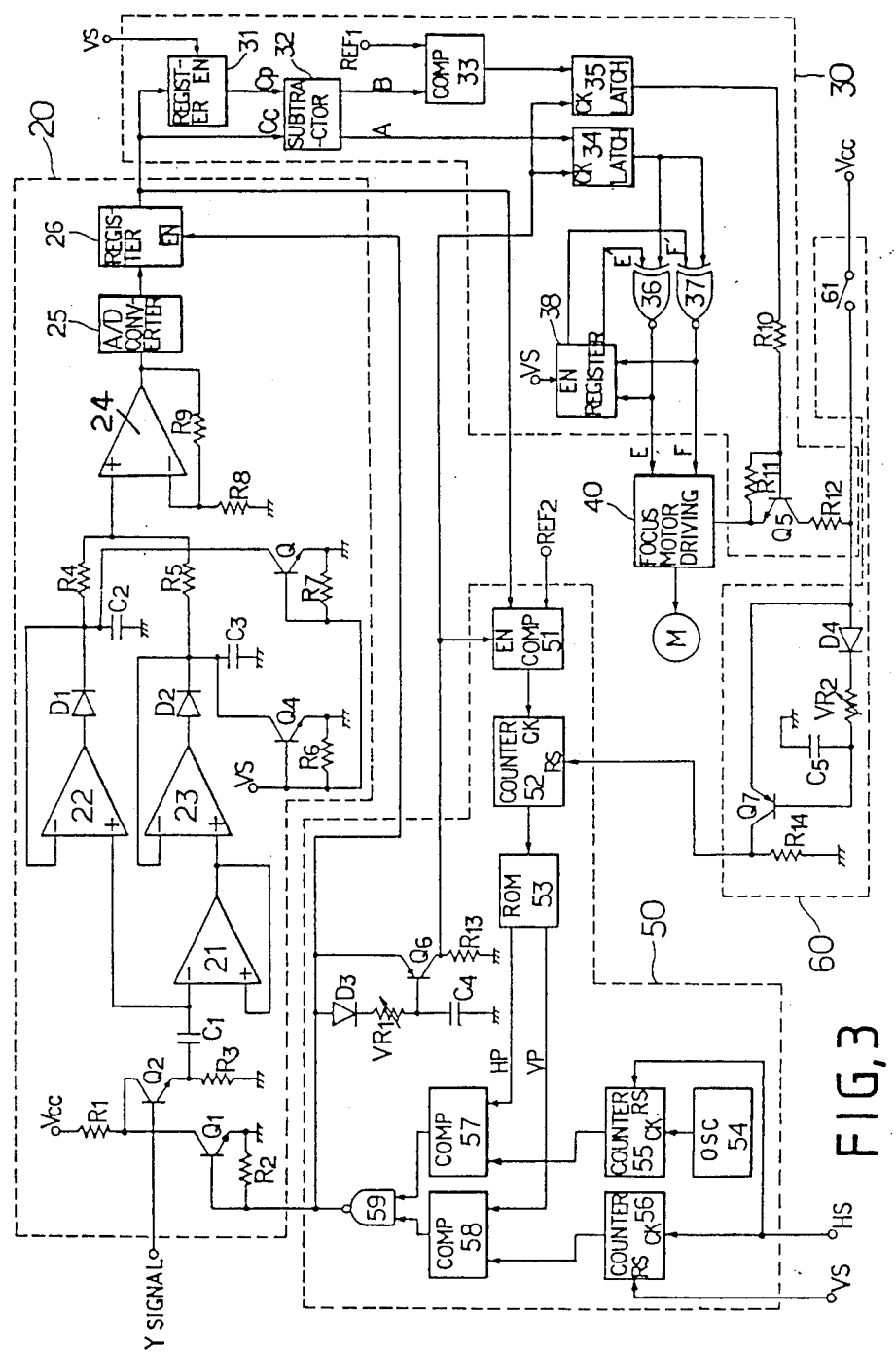
FIG. 3 is a detailed circuit diagram illustrating one embodiment of the automatic focusing system shown in FIG. 2.

Hereinafter, the present invention, constructed as described above, will be explained in detail with reference to FIG. 3, which is a detailed circuit diagram of one embodiment of the invention.

In the contrast detection circuit 20 as shown, when a switching transistor $Q_1$ is turned off, the Y signal output from the image signal processing portion 3 is coupled such that the maximum value of the Y signal is charged in capacitor $C_2$ via a buffering transistor $Q_2$, a resistor $R_3$, a capacitor $C_1$, an operational amplifier 22 and a diode $D_1$ in turn. Also, the Y signal going through capacitor $C_1$ is coupled such that the maximum value of the inverted Y signal is charged in a capacitor $C_3$ via an inverter 21, an operational amplifier 23 and a diode $D_2$. The charged voltages in said capacitors $C_2$ and $C_3$ are then summed in a summer 24 via resistors $R_4$ and $R_5$ respectively, and thereafter converted into digital signals by an analog to digital (A/D) converter 25 and then applied to a register 26. Transistors $Q_3$ and $Q_4$ are turned on by a vertical synchronization signal VS to discharge the charged voltages of capacitors $C_2$ and $C_3$.

In the contrast comparison circuit 30, the output signal of register 26 of the contrast detection circuit 20 is applied to one input terminal of subtractor 32 and the same time applied to other input terminal of subtractor 32 through register 31, which goes to an enable state by the vertical synchronization signal VS. A negative-positive decision signal A of subtractor 32 is applied via a latch 34 to one input terminal of each of the Exclusive NOR gates 36 and 37 which determine the direction of rotation for focus motor driving circuit 40 and send this determination by output signals E and F of said gates 36 and 37. At the same time, previous output signals E' and F' are applied to the the input terminal of Exclusive NOR gates 36 and 37, respectively through a register 38 which is enabled by the vertical synchronization signal VS. An absolute value signal B of subtractor 32 is coupled to one input terminal of the comparator 33 with a constant reference signal $REF_1$ being applied to other input terminal thereof. Then, the output signal of this comparator 33 is applied via a latch 35 and a resistor $R_{10}$ to the base of transistor $Q_5$ for switching the drive voltage of focus motor driving circuit 40.

Further, in the gating indication circuit 50 as shown, the output signal of the register 26 in the contrast detection circuit 20 is applied to one input terminal of comparator 51, whose other input terminal is applied as a constant reference signal $REF_2$. The output signal of comparator 51 is coupled to assign the address of a read only memory (ROM) 53 through a counter 52. Horizontal and vertical signals HP and VP are one input terminal of comparators 57 and 58, respectively. The output signal of the counter 55 is reset by the horizontal synchronization signal HS to count the oscillation signal of oscillator 54. The output signal of the counter 56 is reset by the vertical synchronization signal VS to count the horizontal synchronization signal HS. The outputs of counters 55 and 56 are applied to the other input terminal of comparators 57 and 58, respectively. the output signals of comparators 57 and 58 are applied via a NAND gate 59 to the base of transistor $Q_1$ of the contrast detection circuit 20 and the enable terminal $\overline{EN}$ of register 26. In turn, the output signal of said NAND gate 59 is commonly applied to the enable terminal EN of comparator 51 and to the clock terminals CK of latches 34 and 35 in the contrast comparison circuit 30 through the pulse signal generation circuit which comprises a diode $D_3$, a variable resistor $VR_1$, a transistor $Q_6$ and a resistor $R_{13}$.

Moreover, in the automatic focus switching circuit 60 as shown, the fixed node of the automatic focus switch 61, connected above end to a voltage terminal Vcc, is connected at the other end to the collector side of transistor $Q_5$ in the contrast comparison circuit 30, and also connected to reset terminal RS of the counter 52 in the gating indication circuit 50 through another pulse generation circuit which comprises a diode $D_4$, a variable resistor $VR_2$, a capacitor $C_5$, a transistor $Q_7$ and a resistor $R_{14}$.

The operation of the present invention constructed as described above will now be explained in detail.

If the automatic focus switch 61 of the automatic focus switching circuit 60 is closed when a voltage is applied to the voltage terminal Vcc, voltage Vcc is applied to the collector of transistor $Q_5$ through the resistor $R_{12}$ of the contrast comparison circuit 30, to the emitter of transistor $Q_7$; and simultaneously to the base of transistor $Q_7$ while charging the capacitor $C_5$ through the diode $D_4$ and the variable resistor $VR_2$. Accordingly, a high voltage level pulse signal is output onto the collector of transistor $Q_7$ until more than the predetermined voltage is charged in the capacitor $C_5$. This pulse signal is then applied to the reset terminal RS of the counter 52 in the gating indication circuit 50 for resetting the counter 52. According to this, a ZERO count signal is output from the counter 52 to assign the address 0000 of ROM 52, so that horizontal and vertical signals HP and VP stored in the address previously are applied to one input terminal of comparators 57 and 58, respectively. Also during this time the count signal of the counter 55, which counts the oscillation signal of oscillator 54, is being reset by the horizontal synchronization signal HS and the count signal of the counter 56, which counts the synchronization signal HS by being reset by the vertical synchronization signal VS, are applied to other input terminal of comparators 57 and 58, respectively.

Thus, when the count signals of counters 55 and 56 equal to the vertical pulse signal HP and the horizontal pulse signal VP, respectively, high voltage level signals are output onto the output terminal of comparators 57 and 58 are applied to the input terminal of NAND gate 59 so that a low level signal is output from said output terminal of NAND gate 59 to turn off the transistor $Q_1$ in the contrast detection circuit 20.

Consequently, the Y signal output from the image signal processing portion 3 goes through the transistor $Q_1$. The direct current components of the Y signal are then removed by capacitor $C_1$ and thereafter the resultant Y signal is charged in the capacitor $C_2$ through the operational amplifier 22 and the diode $D_1$, thereby detecting the maximum value of said Y signal. Also, the Y signal going through capacitor $C_1$ is inverted in the inverter 21 and then charged in the capacitor $C_3$ through the operational amplifier 23 and the diode $D_2$, thereby detecting the minimum value of the Y signal. The charged voltages in the capacitors $C_2$ and $C_3$ are then applied to the plus(+) input terminal of summer 24 via the resistors $R_4$ and $R_5$, respectively, so that the difference voltage between the maximum value and the minimum value of the Y signal is output from the output terminal of summer 24. This output voltage of summer 24, which is the contrast value of Y signal, becomes larger value as the focus point comes to be adjusted more accurately. Then, the output voltage of summer 24 is converted into a digital signal by the analog to digital converter 25 and is applied to the register 26. During this time the low level signal output from the NAND gate 59 in the gating indication circuit 50 is applied to an enable terminal EN of register 26 an enable register 26 so that the output signal of said analog to digital converter 25 is stored in the register 26 and then output from it. On the other hand, since low level signals are output from the comparators 57 and 58 when count signals of counters 55 and 56 become different than the horizontal and vertical pulse signals HP and VP, a high level signal is output onto the output terminal the NAND gate 59 which turns on the transistor $Q_1$ of contrast detection circuit 20 and thus turns off the transistor $Q_2$ so that the Y signal is not input to the contrast detection circuit 20. Transistors $Q_3$ and $Q_4$ discharge the charged voltage in the capacitors $C_2$ and $C_3$ during the application of vertical synchronization signal VS.

Further, a high level signal output from said NAND gate 59 is applied to the emitter of transistor $Q_6$ and also applied to the base of transistor $Q_6$ via the diode $D_3$ and the variable resistor $VR_1$ while charging the capacitor $C_4$, so that a high level pulse signal is output onto the collector terminal of said transistor $Q_6$. This pulse signal is then applied each clock terminal CK of latches 34 and 35 in the contrast comparison circuit 30, and also applied to an enable terminal $\overline{EN}$ of comparator 51 enable comparator 51.

Accordingly, the contrast signal output from the register 26 in the contrast detection circuit 20 is input to one input terminal of the comparator 51 and is compared with a constant reference signal $REF_2$ input to other terminal thereof. The contrast reference signal is set to slightly lower level than that of the output signal of register 26 when the focus point is adjusted accurately. Therefore, when the voltage level of the output signal is lower than that of constant reference signal $REF_2$ because the focus point is not adjusted accurately, a pulse signal is output onto the output terminal of comparator 51 and applied to a clock terminal CK of counter 52. Accordingly, the count signal of ONE is output from the counter 52 to assign the address 0001 in ROM 53, and thus horizontal and vertical pulse signals HP and VP prestored in the above address are output to indicate a new area at which the Y signal can be input to the contrast detection circuit 20 in the same manner as described above. Thus, the contrast of the Y signal in the new area is detected by the contrast detection circuit 20 in the same manner as described above and is output as a digital signal from the register 26. When the output signal of register 26 is lower than the constant reference signal $REF_2$, the gating indication circuit 50 indicates another new area with a different focus point.

However, when the focus point is adjusted accurately by repeating the operation as described above, the contrast signal output from the register 26 in the contrast detection circuit 20 becomes higher than the constant reference signal $REF_2$ and count signal of counter 52 continues to remain in the previous state to indicate the area of said previous state contains the focus point.

the contrast signal output from the register 26 in the contrast detection circuit 20 is also applied to one input terminal of the subtractor 32 in the contrast comparison circuit 30 and also stored in the register 31 which becomes enabled by the vertical synchronization signal VS and is then applied to the other input terminal of subtractor 32. As a result, a current field of contrast signal $C_c$ is applied to one input terminal of subtractor 32 and a previous field of contrast signal $C_p$ is applied to other input terminal thereof. Accordingly, the subtractor 32 subtracts the previous field of contrast signal $C_p$ from the current field of contrast signal $C_c$ and then outputs the negative-positive decision signal A. In other words, if $C_c-C_p>0$, the decision signal A is output as a high voltage level; while if $C_c-C_p<0$, the decision signal A is output as a low voltage level, to be applied to the latch 34. This decision signal A output from the subtractor 32, is applied to one respective input terminal of Exclusive NOR gates 36 and 37 when a pulse signal is output from the transistor $Q_6$ in the gating indication circuit 50 is applied to latch 34, as described above.

Further, assuming that in the previous state the output signals E and F of Exclusive NOR gates 36 and 37 are at a high level voltage, the output signals E and F at the high voltage level are stored in the register 38, which becomes enabled by the vertical synchronization signal VS, and are then applied to other input terminal of Exclusive NOR gates 36 and 37 respectively as signals E' and F'. Accordingly, if the decision signal A of subtractor 32 becomes the high voltage level and is commonly applied to one input terminal of Exclusive NOR gates, then the output signals E and F of Exclusive NOR gates 36 and 37 continue to remain at the high voltage level and are applied to the focus motor driving circuit 40. Consequently, the focus motor driving circuit 40 controls the focus motor 5 such that the focus motor 5 is rotated in a forward direction continuously. In this state, if the current field of contrast signal $C_c$ is lower than the previous field of contrast signal $C_p$ so that a low level signal A is one respective input terminal of Exclusive NOR gates 36 and 37, then the output signals E and F of Exclusive NOR gates 36 and 37 go to a low voltage level. Consequently, the focus motor driving circuit 40 controls the focus motor 5 such that the focus motor 5 is rotated in a backward direction.

Further, in the output side of subtractor 32, the absolute value signal B, which is obtained by subtracting the previous field of contrast signal $C_p$ from the current field of contrast signal $C_c$, is output and compared with the constant reference signal $REF_1$. The constant reference signal $REF_1$ is set to be higher than the absolute value signal B when the focus point arrives at an optimal state. Accordingly, when the absolute value signal B is higher than the constant reference signal $REF_1$, a high level signal is output from the comparator 33. This high level signal is stored in the latch 35 and output therefrom when a pulse signal is output from the transistor $Q_6$ in the gating indication circuit 50. Consequently, since the transistor $Q_5$ is turned on to supply a drive voltage to the focus motor driving circuit 40, the focus motor driving circuit 40 controls the focus motor 5 depending upon the output signals E and F of exclusive NOR gates 36 and 37, as described above.

However, if the focus point arrives at an optimal state and the current field of contrast signal $C_c$ becomes almost equal to the previous field of contrast signal $C_p$, then the absolute value signal B becomes lower than the contrast reference signal $REF_1$ and thus a low level signal is output from the comparator 33. Since this low level signal is stored in the latch 35 and output therefrom when a pulse signal is output from the transistor $Q_6$ in the gating indication circuit as described above, the transistor $Q_5$ is turned off and accordingly a drive voltage is not supplied to the focus motor driving circuit 40, thereby stopping the drive of focus motor 5.

The present invention as described above can adjust the focus of video camera automatically by detecting by means of circuitry the contrast of the Y signal that is output from the image signal processing portion without the use of an optical system so that the structure thereof is simplified and thus the system can be lessen in size and weight and the cost of the product reduced significantly. Moreover, since the system according to the present invention is adapted to adjust the focus of video camera by employing the contrast of the Y signal, it can always be focused automatically without being affected by the peripheral background of object.

This invention has been described in detail in connection with the preferred embodiment, but this embodiment is example only and is not to be considered as restricted thereto. It will be easily understood by these skilled in the art that other variations and modifications can be made within the spirit and scope of the invention as claimed.

What is claimed is:

1. An apparatus for automatically focusing a video camera having a zoom lens with a focus drive motor which uses Y signals generated by said video camera comprising:
   means for detecting successive Y signals;
   rotation direction signal means for obtaining a focus motor rotation direction signal using said successive detected Y signals;
   motor start direction signal means for obtaining a focus motor start signal using said detected Y signals; and
   gating indication circuit means for generating a gating signal which indicates when to detect said Y signals, said gating indication circuit means including:
      means for generating a constant value reference signal;
      means for comparing said constant value reference signal with said Y signal contrast value to determine an address;
      memory means for storing ranges corresponding to horizontal and vertical ranges at a plurality of said addresses;
      means for using said addressed horizontal and vertical ranges to determine when to apply said gating signal.

2. An apparatus according to claim 1 wherein said detecting means include:
   means for determining a maximum value and a minimum value for each detected Y signal; and
   means for calculating a contrast value for each detected Y signal, said contrast value being the difference between said maximum value and said minimum value.

3. An apparatus according to claim 2 wherein
   said successive Y signals including a first Y signal, a later second Y signal and a third later Y signal; and
   said rotation direction signal means include:
      means for determining a first difference value indicating the difference value indicating the difference between said first Y signal contrast value and said second Y signal contrast value and a second difference between said second Y signal contrast value and said third Y signal contrast value; and
      means for comparing said first and second difference values to obtain said focus motor direction signals.

4. An apparatus according to claim 3 wherein said motor start direction signal means include:
   means for generating a difference value reference signal;
   means for comparing said difference value reference signal with said Y signal difference value to obtain said focus motor start signal.

5. An apparatus according to claim 1 further including means for signalling to said automatic focusing apparatus that said automatic focusing will not be used.

* * * * *